D. L. RECTENWALD.
SAFETY ATTACHMENT FOR TIRE CHAINS.
APPLICATION FILED MAY 1, 1917.

1,234,568.

Patented July 24, 1917.
2 SHEETS—SHEET 1.

WITNESSES:
Walter S. Klemansk
Richard Townsend

INVENTOR.
Daniel L. Rectenwald
BY William B. Wharton
ATTORNEY.

D. L. RECTENWALD.
SAFETY ATTACHMENT FOR TIRE CHAINS.
APPLICATION FILED MAY 1, 1917.

1,234,568.

Patented July 24, 1917.
2 SHEETS—SHEET 2.

WITNESSES:
Walter S. Klemanek
Richard Townsend

INVENTOR.
Daniel L. Rectenwald
BY William B. Wharton
ATTORNEY.

UNITED STATES PATENT OFFICE.

DANIEL L. RECTENWALD, OF PITTSBURGH, PENNSYLVANIA.

SAFETY ATTACHMENT FOR TIRE-CHAINS.

1,234,568.  Specification of Letters Patent.  Patented July 24, 1917.

Application filed May 1, 1917. Serial No. 165,705.

*To all whom it may concern:*

Be it known that I, DANIEL L. RECTENWALD, a citizen of the United States, and resident of Pittsburgh, Allegheny county, Pennsylvania, have invented a new and useful Improvement in Safety Attachments for Tire-Chains, of which the following is a specification.

This invention relates to a safety attachment for tire chains.

The object of the invention is to provide an attachment which may be secured to a tire chain of a usual construction; and which serves to prevent loss of the tire chain upon breakage or unfastening of the same, by permitting it to slip completely from the wheel of the vehicle to which it is applied and by causing it to be dragged behind the vehicle from the axle or brake-drum thereof in such position that it does not become entangled with or knock against the wheel or other parts of the vehicle. A further object of the invention is to provide means, of the nature above indicated, which may readily be attached to or detached from the vehicle and tire chain; and which is also simple in construction, inexpensive to manufacture, and will not under any contingency cause injury to the axle or other parts of the vehicle to which it is applied.

Figure 1:
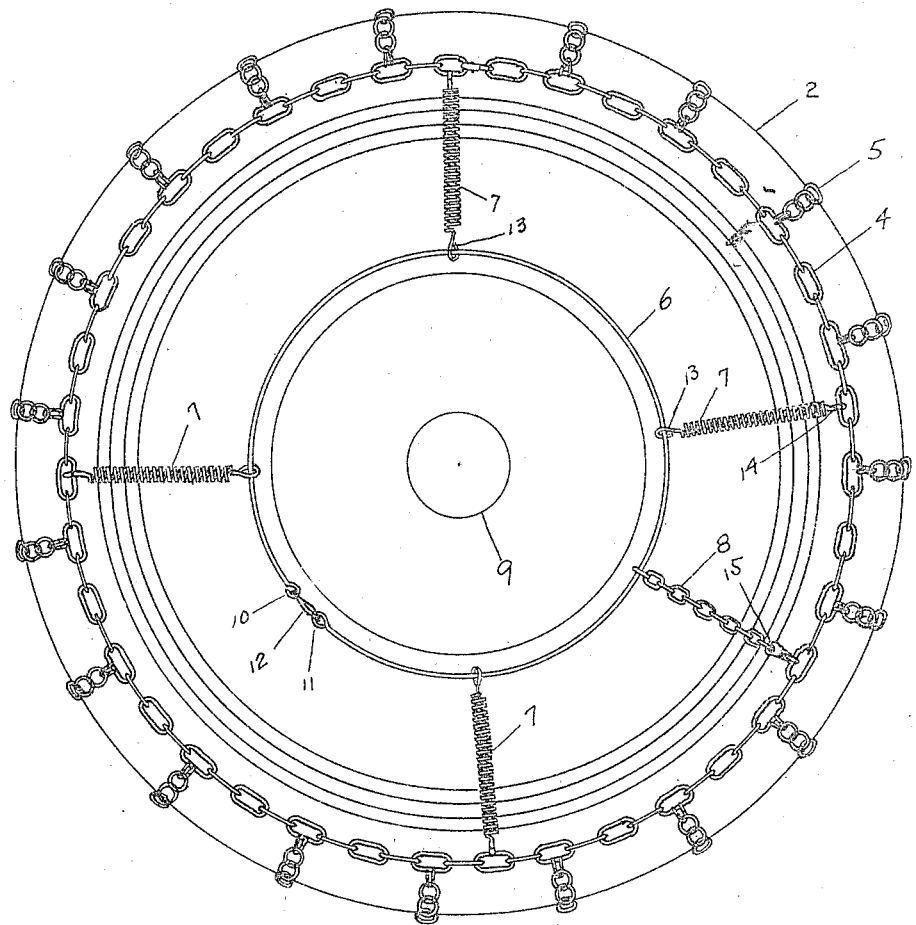
Figure 2:
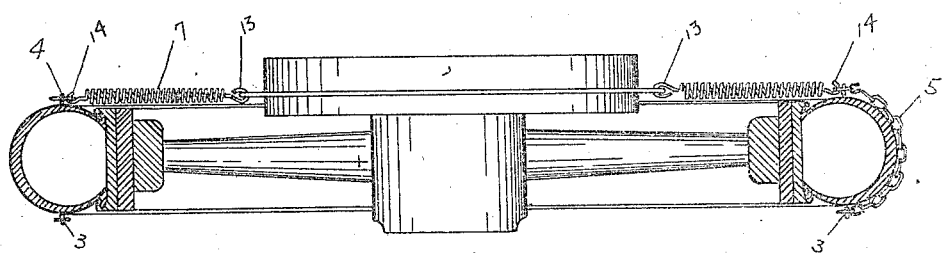
Figure 3:
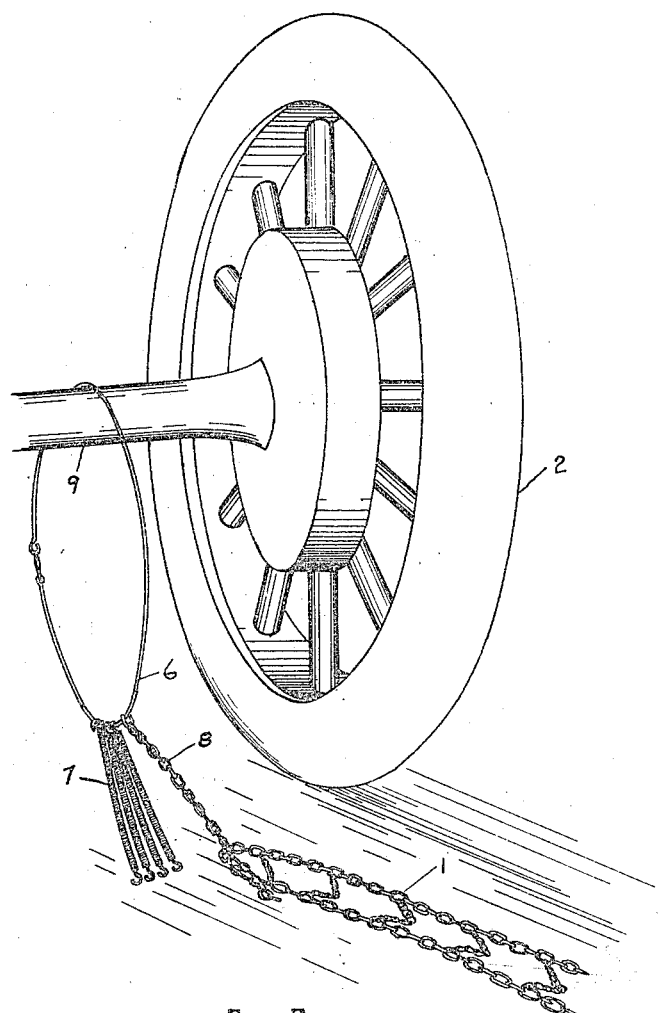

In the accompanying drawings, Figure 1 is an inner elevation of an automobile wheel showing a tire chain and the safety attachment in position thereon; Fig. 2 is a substantially diagrammatic section through the wheel; and Fig. 3 is a perspective view illustrating the position assumed by the tire chain and the various members of the attachment upon breakage or unfastening of the tire chain.

The tire chain 1, which is of usual form, is shown as applied to the wheel 2 of a power propelled vehicle, and consists of an outer side chain 3, an inner side chain 4, and a plurality of cross connecting chains 5.

The safety attachment proper comprises a ring 6 and spring members 7 for supporting the ring from the inner side chain member 4 of the tire chain, and a chain, or other suitable flexible member 8, for securing the side chain member 4 to the ring 6. The ring 6 is of light construction, and is a split or breakable ring in order to permit of its being placed in position surrounding the axle 9 of the vehicle. As shown the ring is formed of wire which is light but is of a moderate degree of stiffness, and is provided at its ends with eyes 10 and 11 arranged to be connected by a suitable snap hook 12. The ring may thus be passed around the axle 9 and its ends joined to form an unbroken ring surrounding the axle. When in this position, the ring is supported out of contact with the axle and brake-drum of the vehicle by means of the spring members 7, each of which is provided at one extremity with an eye 13 surrounding and slidable upon the ring 6, and at its other extremity with an open hook 14 which is passed through one of the links of the side chain 4. The tire chain 1 is secured to the ring 6 by means of the chain 8, through a link of which the ring 6 is passed, and which is provided with a snap hook 15 which engages one of the links of the side chain 4.

Normally, therefore, with the tire chain in position on the tire, and the parts connected and in the position shown in Fig. 1 of the drawings, the ring 6 is supported out of contact with the axle by means of the spring members 7, and since these spring members, together with the chain 8, are arranged to slide upon the ring, the device has little or no effect upon the position of the tire chain on the tire. In case, however, of a breakage of one of the side chain members 3 and 4, or of the breakage or unfastening of the tire chain connections, the tire chain as a whole will tend to slide off the wheel 2. This tendency is not resisted by the spring or supporting members 7, since the open hooks 14 thereon readily become disengaged from the side chain 4 and the tire chain as a whole is permitted to fall from the wheel.

Under these conditions, as illustrated in Fig. 3 of the drawings, the ring 6 rides upon the axle 9, or the brake drum, of the vehicle and the spring members 7 depend in disconnected position therefrom, while the tire chain, which is securely connected to the ring by means of the chain 8 and snap hook 15, is dragged behind the vehicle in an extended position well out of contact with any of the parts of the vehicle.

The device above described prevents the loss of a tire chain through breakage or disconnection of the same and at the same time permits it to slide completely from the wheel, so that neither the wheel nor the chain itself can be injured, nor the wheel or other part of the vehicle marred, as might occur through a partial disengagement of the chain. The construction of the supporting spring members 7 and the use of the single connecting member 8 permit the chain to be dragged in an extended position, so that it does not form a sack or net such as would be apt to swing against the vehicle wheel or catch in obstructions in the roadway.

The ring 6 is preferably made of wire which is stiff enough to resist deformation when held in position by means of its connections with the tire chain, but which is of sufficiently light construction to permit it to be readily broken, if the chain being dragged should catch in any firmly seated object. Danger of injury to the vehicle axle because of any sudden and severe pull or wrench is thus avoided. In constructing the device, the diameter of the ring may be obviously so regulated that it will surround the brake-drum of the vehicle to which it is to be applied, the length of the spring members 7 and chain 8 being varied according to the relative diameter of the ring and of the vehicle wheel.

The device as a whole is simple and inexpensive in its construction, is capable of being rapidly attached or detached; and performs the novel function of preventing loss of a tire chain upon breakage or unfastening of the same, while permitting it to slip completely from the wheel.

What I claim is:—

1. A safety attachment for tire chains comprising a tire chain consisting in side and cross chain members and arranged to be applied to the tire of a vehicle wheel, a ring arranged to surround the axle of the vehicle, a flexible member for securing the ring to one of the side chains, and a plurality of spring members for normally supporting said ring from said side chain in a position surrounding said axle, the connection between each of said spring members and the chain being such that it will be automatically broken upon breakage or unfastening of the tire chain.

2. A safety attachment for tire chains comprising a tire chain consisting in side and cross chain members and arranged to be applied to the tire of a vehicle wheel, a ring arranged to surround the axle of the vehicle, a plurality of resilient members for normally supporting said ring from one of said side chains, the connection between each of said resilient members and said chain being such that it will be automatically broken upon breakage or unfastening of the tire chain, and a flexible member arranged to connect the ring and tire chain irrespective of such breakage or unfastening.

3. A safety attachment for tire chains comprising a tire chain consisting in side and cross chain members and arranged to be applied to the tire of a vehicle wheel, a split ring arranged to be located in position surrounding the axle of the vehicle, a plurality of spring members for normally supporting said ring from one of said side chains out of contact with said axle, the connection between each of said spring members and said chain being such that it will be automatically broken upon breakage or unfastening of the tire chain, and a flexible member arranged to connect the ring and tire chain irrespective of such breakage, whereby upon breakage or unfastening of the tire chain the ring will ride upon the vehicle axle and the chain will be dragged in extended position by means of its connection therewith.

4. A safety attachment for tire chains comprising a tire chain consisting in side and cross chain members and arranged to be applied to the tire of a vehicle wheel, a split ring arranged to be locked in position surrounding the axle of the vehicle, a plurality of resilient arms slidable on the ring and provided with open hooks for engagement with one of the side members of the tire chain, and a flexible connecting member slidable on the ring and arranged to secure the chain thereto.

In witness whereof, I have hereunto set my hand and seal.

DANIEL L. RECTENWALD. [L. S.]

Witnesses:
WALTER S. KLEMANSK,
SUE B. FRITZ.